United States Patent
Ciccolini

(10) Patent No.: US 10,048,571 B2
(45) Date of Patent: Aug. 14, 2018

(54) ACTION CAMERA

(71) Applicant: MONDO NOVO ELECTRONICS SOCIETA' A RESPONSABILITA' LIMITATA, Matelica (MC) (IT)

(72) Inventor: Marco Ciccolini, Matelica (IT)

(73) Assignee: MONDO NOVO ELECTRONICS SOCIETA' A RESPONSABILITA' LIMITATA, Matelica (MC) (IT)

( * ) Notice: Subject to any disclaimer, the term of this patent is extended or adjusted under 35 U.S.C. 154(b) by 0 days.

(21) Appl. No.: 15/326,577

(22) PCT Filed: Jul. 22, 2015

(86) PCT No.: PCT/EP2015/066735
§ 371 (c)(1),
(2) Date: Jan. 16, 2017

(87) PCT Pub. No.: WO2016/016059
PCT Pub. Date: Feb. 4, 2016

(65) Prior Publication Data
US 2017/0199446 A1    Jul. 13, 2017

(30) Foreign Application Priority Data

Jul. 28, 2014   (IT) ............................ MC2014A0061

(51) Int. Cl.
*G03B 17/08*   (2006.01)
*G03B 17/56*   (2006.01)
(Continued)

(52) U.S. Cl.
CPC ............. *G03B 17/08* (2013.01); *F16M 13/02* (2013.01); *G03B 17/561* (2013.01);
(Continued)

(58) Field of Classification Search
CPC ...... G03B 17/08; G03B 17/561; F16M 13/02; H04N 13/0239; H04N 13/0296; H04N 2213/001
See application file for complete search history.

(56) References Cited

U.S. PATENT DOCUMENTS 7,619,680 B1    11/2009   Bingle et al.
8,764,318 B2 *  7/2014    Wada ................... H04N 5/2252
                                                                348/143
(Continued)

FOREIGN PATENT DOCUMENTS

DE    202006017665 U1    2/2007
EP       2026564 A1      2/2009
(Continued)

OTHER PUBLICATIONS

International Search Report for corresponding International Application No. PCT/EP2015/066735.

*Primary Examiner* — Twyler Haskins
*Assistant Examiner* — Fayez Bhuiyan
(74) *Attorney, Agent, or Firm* — Egbert Law Offices, PLLC

(57) ABSTRACT

An action camera having a camera body joined to the cover, at least one optical unit disposed inside the cavity of the cover, and connection means used to connect the cover to the base support in such manner that the cover rotates with respect to the base support around an axis. The cover being a cap shaped as a portion of geoid cut at a parallel of 50°-60° in such a manner that the cap has a basically flat upper surface and a lateral surface that is curved.

13 Claims, 4 Drawing Sheets

(51) Int. Cl.
*F16M 13/02* (2006.01)
*H04N 13/02* (2006.01)
*H04N 13/239* (2018.01)
*H04N 13/296* (2018.01)

(52) U.S. Cl.
CPC ..... *H04N 13/0239* (2013.01); *H04N 13/0296* (2013.01); *H04N 13/239* (2018.05); *H04N 13/296* (2018.05); *H04N 2213/001* (2013.01)

(56) References Cited

U.S. PATENT DOCUMENTS

| | | | |
|---|---|---|---|
| 2009/0216394 A1* | 8/2009 | Heppe | B64C 39/024 701/16 |
| 2012/0008930 A1 | 1/2012 | Barley et al. | |
| 2013/0051778 A1 | 2/2013 | Dimotakis | |

FOREIGN PATENT DOCUMENTS

| | | |
|---|---|---|
| EP | 2353940 A1 | 8/2011 |
| WO | 2013060370 A1 | 5/2013 |

* cited by examiner

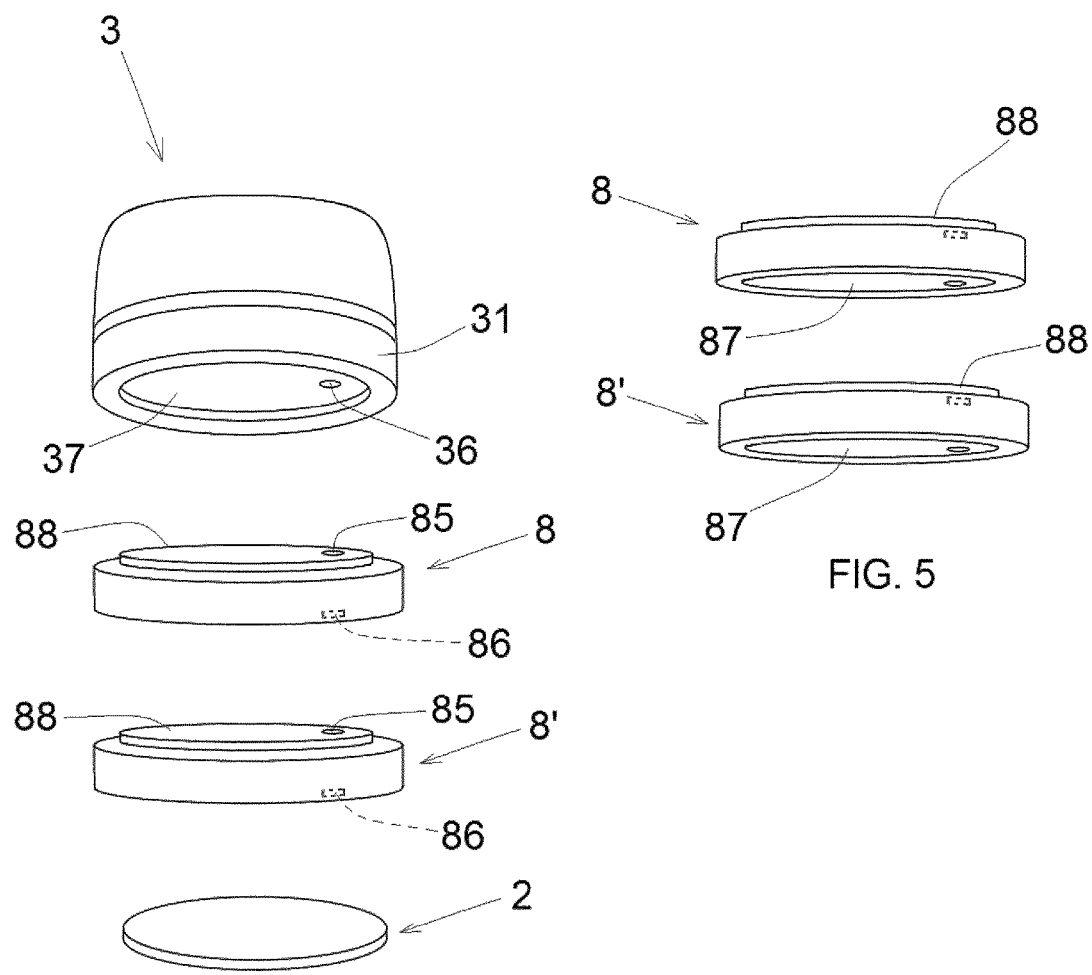

ACTION CAMERA

The present patent application for industrial invention relates to an improved action camera.

Action cameras are known and generally used during the practice of sports, such as for example skiing, windsurfing, snowboarding, mountain biking, cross-country motorcycling, etc. These action cameras are fixed to moving bodies, such as for example bicycle or motorcycle handles, ski boots, snowboard helmets, or the like, in order to allow a user to record films without the need to hold the camera with his hands.

Specifically, similar action cameras comprise:
a camera body;
a cover for the said camera body;
a base support used to support the said cover and intended to be fixed to a moving body.

The camera body comprises at least one optical unit and the cover comprises a transparent portion, in correspondence of the optical unit, in such manner that the optical unit can take shots while it is protected by the transparent portion of the cover.

In most of the cases, the cover used to protect the camera body, is provided with seals for making the camera body waterproof.

Generally speaking, the cover is made of plastic material and is internally provided with a shape that allows the cover to receive the camera body exactly without any clearance. In general the camera body has a parallelepiped shape and is provided with a series of facets at right angle that are joined by means of corners. The walls of the cover have a constant thickness. The cover is externally provided with a series of facets at right angle that are joined with rounded corners in order to prevent the presence of dangerous portions in case of accidental shocks.

The parallelepiped shape of such a cover is impaired by the fact that it is provided with:
a number of more or less rounded corners, which are dangerous in case of a strong impact between the user's body and the cover;
a number of flat surfaces that impair the aerodynamic and fluid dynamic properties of the cover, which can damage the integrity of the action camera in case of an impact with surf boards, roars or the like, thus causing the detachment of the action camera from the body on which it is fixed or, in the worst case, breaking the cover or the camera body contained in it.

The poor aerodynamic and fluid dynamic properties of the cover can impair the correct position of the camera body. In fact, the camera body is fixed to the base support by means of adjustment and locking means. The adjustment and locking means are stressed by the fluid (air or water) in which the action camera flows at high speed. Inevitably, such a stress of the fluid tends to force the adjustment and locking means, which may fail. Moreover, the incident forces on the adjustment and locking means trigger an angular moment that generates a rotation of the adjustment and locking means, which tends to make the camera body lose its correct position with respect to the base support, thus impairing the correct orientation of the camera body.

These action cameras are impaired by an additional drawback related with the fact that electronic devices, if any, such as extra batteries, obstacle detection sensors, environmental data detection sensors, GPS systems, wireless communication systems and the like, are disposed outside the cover and are connected to the action camera by means of connection means. Therefore, the said electronic devices increase the volume of the action camera, are dangerous in the case of a strong impact with the user and are easily subject to wear.

EP2353940A1 discloses a vision system comprising:
a base support suitable for being fixed to a vehicle;
an optical unit coupled with a first stationary housing fixed to the base support, and
a cover rotatable coupled with the base support.

The cover comprises a disk connected to the base support, a cylindrical tube and a lid that define a cavity wherein the optical unit is disposed.

The lid has an edge with sharp corners (90° angle in axial section) that can be dangerous.

The optical unit is coupled with the base support. Therefore, after mounting the vision system, the user cannot adjust the position of the optical unit.

DE202006017665U1 discloses an action camera comprising a housing for one optical unit with sharp corners (90° angle in axial section), which are very dangerous. Moreover, such an action camera only comprises one optical unit and therefore cannot take 3D shots.

The purpose of the present invention is to remedy the drawbacks of the prior art, by disclosing an aerodynamic, fluid dynamic and shock-resistant action camera that is safe and reliable for the user.

Another purpose is to provide a versatile, practical, functional and flexible action camera that is suitable for integrating multiple functions, without impairing its reliability and aerodynamic properties, as well as its usability and ergonomics.

Another purpose of the present invention is to disclose an action camera that can change its shooting mode, simultaneously taking shots from different angles and/or in 3D mode.

The action camera of the invention comprises:
a support base that is suitable for being fixed to a body intended to be moving;
a cover that is removably connected to the base support; the said cover comprising a base disk and an at least partially transparent cap that is fixed to the base disk in such manner to define a cavity bordered by the said base disk and by the said cap;
at least one camera body comprising at least one optical unit provided with an optical axis; the said at least one optical unit being disposed inside the said cavity of the cover and mounted on the said base disk of the cover; and
connection means that connect the cover to the base support in such manner that the said cover rotates with respect to the said base support around an axis orthogonal to the base disk of the cover;

The action camera also comprises actuation means disposed inside the said cavity of the cover and mounted on the said base disk of the cover to actuate the said at least one optical unit.

The cap is shaped as a portion of geoid, cut at a parallel of about 50°-60° in such manner that the cap comprises a basically flat upper surface and a lateral surface that is curved like a portion of ellipsoid of rotation in such manner to avoid sharp corners and in such manner that, in any position of the said at least one optical unit, the optical axis of the said at least one optical unit is always orthogonal to the tangent of the cap passing through the point in which the optical axis cuts the cap, thus minimizing the risk of diffraction caused by the presence of the cap.

For purposes of clarity the description of the action camera according to the invention continues with reference to the attached drawings, which are intended for purposes of illustration only, and not in a limiting sense, wherein:

FIG. 4 is a perspective exploded view of a second embodiment of the action camera of the invention;

FIG. 5 is a perspective view of two modules of the action camera of FIG. 4, in which each module is shown from a different angle compared to FIG. 4.

FIGS. 1 and 2 show the action camera of the invention, which is generally indicated with reference numeral (1).

Figure 1:
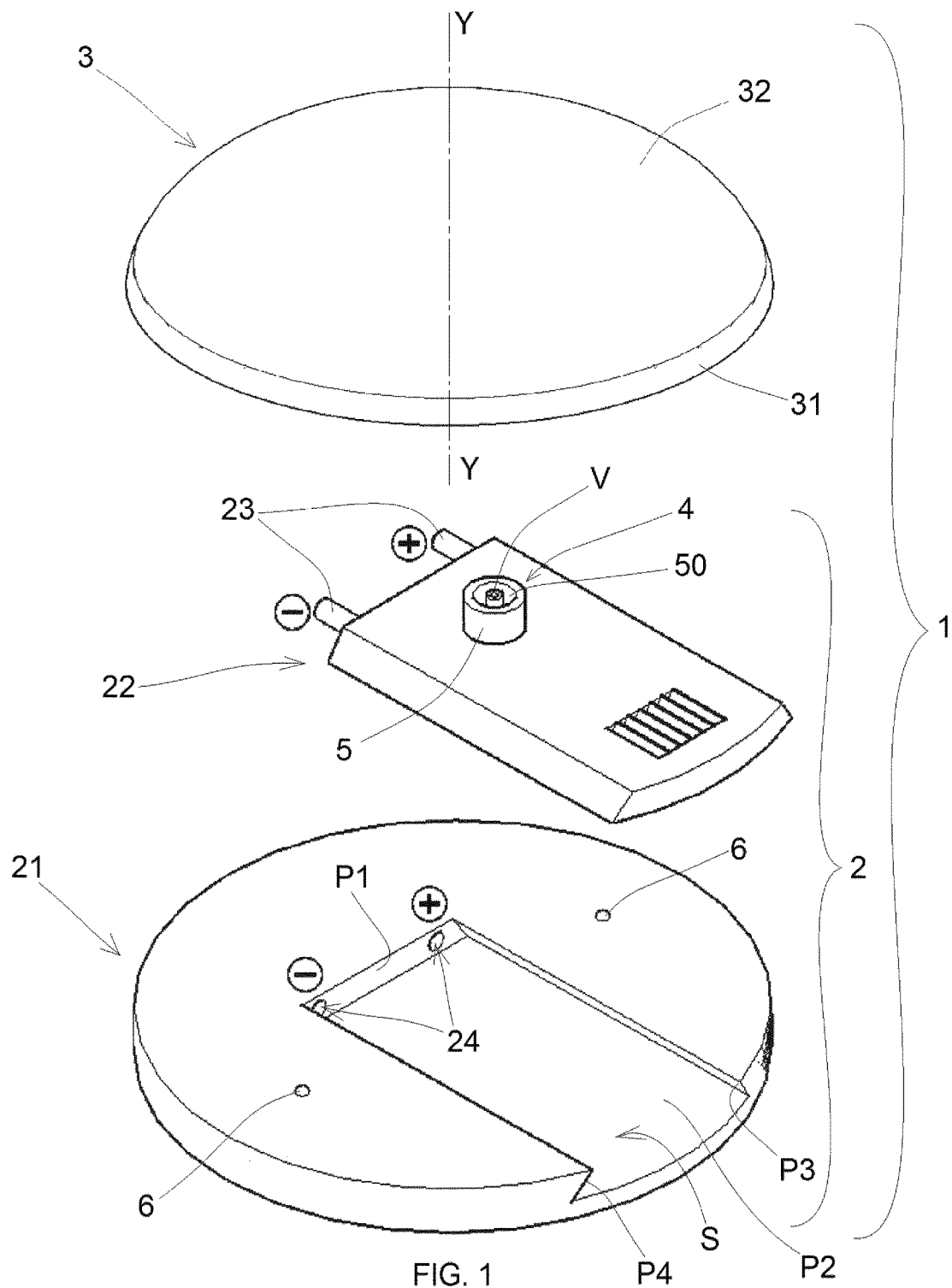
FIG. 1 is a top axonometric exploded view of the action camera of the invention.

The action camera (1) comprises a base support (2) and a cover (3) removably connected to the base support (2). The base support (2) is suitable for being fixed to a body that is intended to move, such as, for example, a helmet, a handle, a ski boot, etc. which is hereinafter defined as a moving body.

The said base support (2) comprises:
  a stationary support element (21) intended to be fixed to the mobile body; and
  a mobile support element (22) removably connected to the stationary support element (21).

The stationary support element (21) is shaped as a disc-like plate. The mobile support element (22) is shaped as a rectangular plate.

The stationary support element (21) comprises a recessed housing (S) that houses the mobile support element (22) in such manner that the mobile support element (22) is flush to the stationary support element (21).

The recessed housing (S) is crosswisely provided with a dovetail profile and is bordered by a transverse wall (P1), a bottom wall (P2) and two longitudinal lateral walls (P3, P4) that are inclined by an acute angle with respect to the bottom wall (P2).

Consequently, the said mobile support element (22) can be inserted in the said recessed housing (S) of the stationary support element (21) by making the mobile support element (22) slide in the recessed housing (S).

The longitudinal sidewalls (P3, P4) of the recessed housing (S) can be tilted by a right or obtuse angle with respect to the bottom wall (P2) and, in such a case, the mobile support element (22) is inserted and fitted in the recessed housing (S) from up downwards.

The base support (2) of the action camera (1) comprises coupling/uncoupling means (23, 24) that provide for coupling/uncoupling the mobile support element (22) and the stationary support element (21). The coupling/uncoupling means (23, 24) advantageously comprise two pins (23) joined with the mobile support element (22) and two holes (24) obtained on the transverse wall (P1) of the recessed housing (S). In this way the pins (23) of the mobile support element are engaged in the holes (24) of the recessed housing (S) of the stationary support element.

With reference to the attached figures, the cover (3) of the action camera (1) comprises:
  a base disk (31); and
  a cap (32) made of at least partially transparent material and fixed to the base disk (31) in such manner to define a cavity (32a) defined by the said base disk (31) and the said cap (32).

Figure 3:
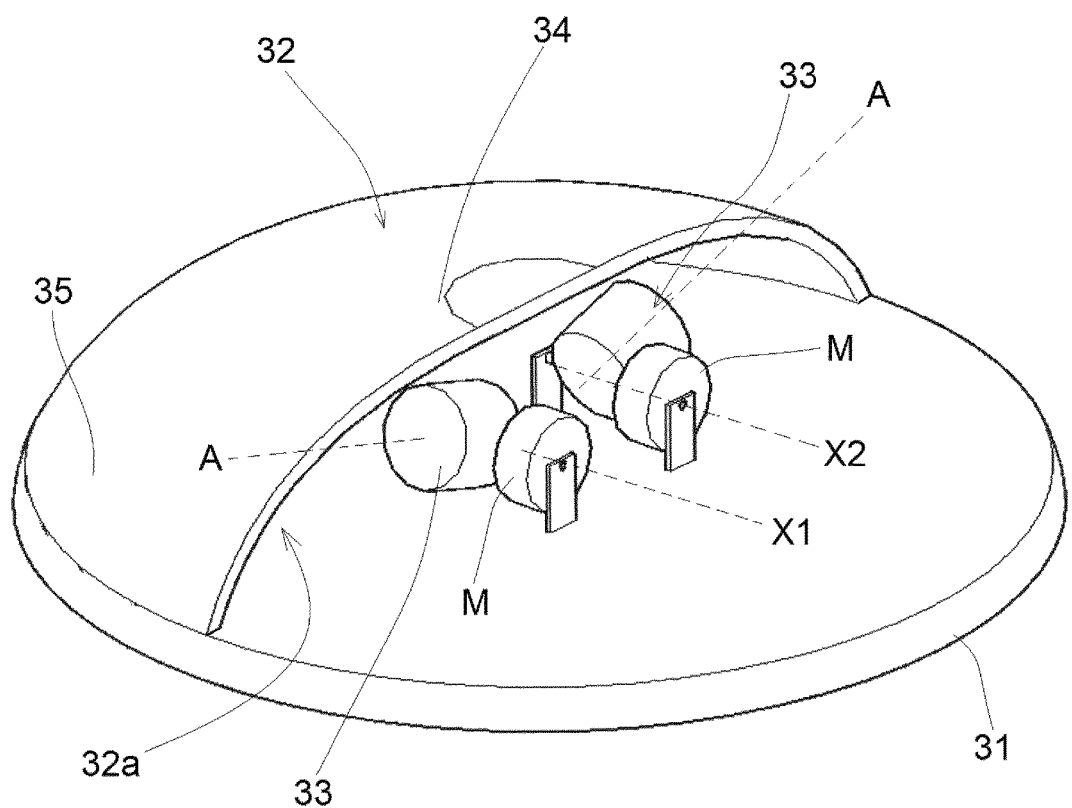
FIG. 3 is a top axonometric view of the cover of the action camera of FIG. 1, in which the cap of the cover is partially removed in order to show the optical units of the cover.

With reference to FIG. 3, the action camera (1) also comprises a camera body that is supported by the base disk (31) and is housed in the cavity (32a) of the cover (3). The camera body comprises two optical units (33) mounted with possibility of moving with respect to the base support in such manner to be oriented. The optical units (31) have optical axes (A) lying on the same plane, which is orthogonal to the base disk (31) of the cover. The optical units (33) are revolvingly mounted with respect to the axes of rotation (X1, X2) that are parallel to the base disk (31) of the cover as well as mutually parallel.

The cap (32) can be made of transparent material only in a central strip around the plane whereon the optical axes (A) of the optical units lay.

The action camera comprises actuation means (M) intended to actuate each optical unit (33) of the camera body in order to change its orientation.

The said actuation means (M) allow the said two optical units (33) to be in three different positions:
  a first position in which the said two optical units (33) have diverging optical axes (A) (see FIG. 3); in this case the action camera can take shots in two different directions (for example, front and back with respect to the moving direction);
  a second position in which the two optical units (33) have parallel optical axes (A) that are perpendicular to the base disk (31); in this case the action camera can take 3D shots according to a direction that is perpendicular to the base disk (31);
  a third position in which the two optical units (33) have converging optical axes (A) that are incident in a point of incidence; in this case the action camera can take 3D shots, accentuating a stereoscopic effect with respect to the second position.

It must be noted that, although the attached figures only show two optical units (33), the action camera of the invention can comprise a plurality of optical units (33) that can be moved in such manner to be disposed in multiple positions.

In order to move the optical units (33), the actuation means (M) can be advantageously be servomotors, such as for example brushless motors or stepping motors. The fact that a motor (M) is used for each optical unit (33) allows for moving the optical units independently and for making 3D shots with various independent positions.

The cap (32) is shaped as a portion of geoid cut at a parallel of approximately 50-60°. In this way, the cap (32) comprises a basically flat upper surface (34) and a lateral surface (35) that is curved like a portion of ellipsoid of rotation. The shape of a portion of geoid has been studied in such manner that in any position of the optical units (33), the optical axes (A) of the optical units are always orthogonal to the tangent of the cap (32) passing through the point in which the optical axis (A) of the optical unit (33) cuts the cap (32), thus minimizing the risk of diffraction caused by the presence of the cap.

Moreover, being shaped as a portion of geoid, the cap (32) has no sharp corners, and therefore it permits to optimize the aerodynamic and fluid dynamic properties of the action camera (1), as well as to reduce the damage caused by possible shocks between the action camera and foreign bodies in general.

In this way the forces tend to slide on the surface of the cap (32) without generating angular momentums that may cause the rotation of the cap and the detachment of the action camera from the body to which the action camera (1) is fixed.

The action camera (1) of the invention also comprises a battery (not shown in the enclosed figures). The battery electrically powers the camera body. The battery is preferably integrated in the mobile support element (22) of the base support (2).

The two pins (23) of the mobile support element (22) and the corresponding holes (24) of the stationary support element (21) not only act as coupling/uncoupling means between the mobile support element (22) and the stationary support element (21), but also as conductors for the transmission of electricity between the battery and the camera body of the action camera.

The action camera (1) can advantageously comprise additional housings for additional batteries, which are obtained in the base support (2).

Figure 2:
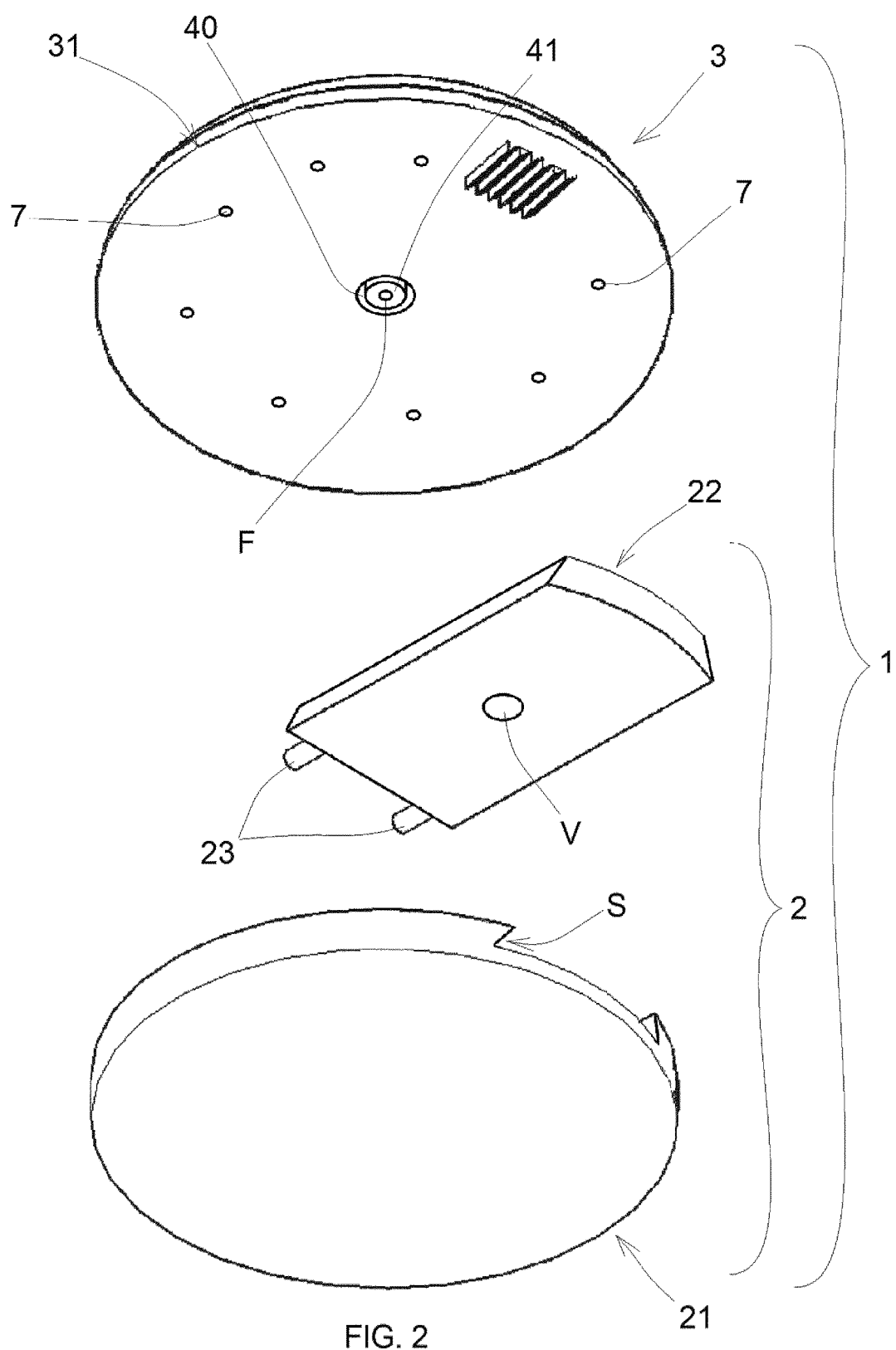
FIG. 2 is a bottom axonometric exploded view of the action camera of the invention.

With reference to FIGS. 1 and 2, the action camera (1) also comprises connection means (4) of male-female type that connect the cover (3) to the base support (2) in such manner that the cover (3) rotates with respect to the base support (2) around an axis (Y-Y) orthogonal to the base disk (31).

The connection means (4) comprise a pin (5) that protrudes from the mobile support element (22) in order to be engaged in a hole (40) obtained on the base disk (31) of the cover (3).

The pin (5) of the mobile support element is internally empty and is provided with a through hole (50), A shank (41) is provided inside the hole (40) of the base disk (31) of the cover. The shank (41) has a threaded hole (F) that coincides with the center of the base disk (31) of the cover.

Although connection means (4) of male-female type are shown in FIGS. 1 and 2, the said connection means can alternatively be of bayonet type. In such a case, the base disk (31) of the cover is provided with a lower housing. The base support (2) is inserted in the lower housing of the base disk (31) and rotated inside the said lower housing of the base disk (31) in such manner to lock in translation the base support (2) with respect to the cover (3).

The action camera (1) also comprises locking means (V) to lock the said connection means (4).

The said locking means (V) comprise a screw (V) that is inserted in the hole (50) of the pin (5) of the mobile support element and is screwed into the threaded hole (F) of the shank (41) disposed in the hole (40) of the base disk (31) of the cover.

With reference to FIGS. 1 and 2, the action camera (1) also comprises anti-rotation means (6, 7) disposed on the cover (3) and on the base support (2) to prevent a free rotation of the cover (3) with respect to the base support (2).

The anti-rotation means (6, 7) comprise a plurality of holes (7) that are advantageously obtained on the base disk (31) of the cover (3), and a plurality of buttons (6), each of them provided with a retractable free end that protrudes from the stationary support element (2) and is inserted in one of the said holes (7).

The cover (3) is coupled, with water-seal properties, with the base support (2) in such manner that the action camera (1) is waterproof.

FIGS. 4 and 5 illustrate a second embodiment of the action camera (1) that comprises a plurality of modules (8, 8') stacked between the base support (2) and the base disk (31) of the cover (3). Each module (8, 8') can comprise one or more electronic devices, such as for example, extra batteries, obstacle detection sensors, environmental data detection sensors, GPS sensors, wireless communication systems, and the like.

To that end, the base disk (31) of the cover has a lower electrical contact (36) that protrudes in lower position from the base disk (31) of the cover.

Each module (8, 8') has an upper electrical contact (85) and a lower electrical contact (86). In this way the lower electrical contact (36) of the base disk (31) of the cover goes in contact with the upper electrical contact (85) of a first module (8). The lower electrical contact (86) of the first module (8) goes in contact with the upper electrical contact (85) of a second module (8'), etc.

The base support (2) covers the last module.

The base disk (31) of the cover has a lower disk-shaped housing (37) obtained in the lower surface of the base disk (31) of the cover. Each module (8, 8') has an upper disk-shaped projection (88) that protrudes in upper position from the module and a lower disk-shaped housing (87) obtained in a lower surface of the module.

In view of the above, the upper disk-shaped projection (88) of the first module (8) is engaged in the lower disk-shaped housing (37) of the base disk (31) of the cover. The upper disk-shaped projection (88) of the second module (8') is engaged in the lower disk-shaped housing (87) of the first module (8), etc.

The modules (8, 8') are coupled together, as well as with the cover (3) and the waterproof base support (2).

In this way a compact action camera without sharp corners or protruding elements is obtained. The electronic devices inserted in the modules (8, 8') are protected against external shocks and do not impair the aerodynamic and fluid dynamic properties of the action camera.

The invention claimed is:

1. An action camera comprising: a base support fixable to a movable body; a cover removably connected to said base support, said cover having a base disk and a partially transparent cap affixed to the base disk so as to define a cavity; at least one camera body having at least one optical unit having an optical axis, the optical unit disposed inside the cavity of the cover and mounted on the base disk of the cover; a connector that connects said cover to said base support such that said cover rotates with respect to said base support around an axis orthogonal to the base disk of said cover; and an actuator disposed in the cavity of the cover and mounted on the base disk so as to actuate the at least one optical unit, the partially transparent cap having a shape of a portion of a geoid cut at a parallel of 50° to 60° so that the partially transparent cap has a generally flat upper surface and a lateral surface that has a curve of a portion of an ellipsoid of rotation such that in any position of the at least one optical unit the optical axis is always orthogonal to a tangent of the partially transparent cap passing through a point in which the optical axis cuts the partially transparent cap, wherein the at least one camera body comprises a pair of optical units having the optical axes laying on a common plane orthogonal to the base disk of the cover, the pair of optical units being revolvingly mounted with respect to axes of rotation that are parallel to the base disk and parallel to each other.

2. The action camera of claim 1, wherein each optical unit is actuated by said actuator so as to allow the pair of optical units to be in three reciprocal positions, wherein a first reciprocal position has the pair of optical units with diverging optical axes so that the action camera can take shots in two different directions, wherein a second reciprocal position has the pair of optical units with parallel optical axes that are perpendicular to the base disk in such manner that the action camera can take three-dimensional shots according to a direction perpendicular to the base disk, wherein a third reciprocal position has the pair of optical units with converging optical axes that are incident in a point of incidence in such manner that the action camera can take three-dimensional shots so as to accentuate a stereoscopic effect with respect to the second reciprocal position.

3. The action camera of claim 2, wherein said actuator comprises servomotors having brushless motors or stepping motors.

4. An action camera comprising: a base support fixable to a movable body, said base support comprising: a stationary support element adapted to be affixed to the movable body; a mobile support element removably connected to said stationary support element; and a coupler cooperative with said stationary support element and said mobile support element so as to allow said stationary support element to be selectively coupled or uncoupled, said stationary support element having a recessed housing that houses said mobile support element such that said mobile support element is flush with said stationary support element; a cover removably connected to said base support, said cover having a base disk and a partially transparent cap affixed to the base disk so as to define a cavity; at least one camera body having at least one optical unit having an optical axis, the optical unit disposed inside the cavity of the cover and mounted on the base disk of the cover; a connector that connects said cover to said base support such that said cover rotates with respect to said base support around an axis orthogonal to the base disk of said cover; and an actuator disposed in the cavity of the cover and mounted on the base disk so as to actuate the at least one optical unit, the partially transparent cap having a shape of a portion of a geoid cut at a parallel of 50° to 60° so that the partially transparent cap has a generally flat upper surface and a lateral surface that has a curve of a portion of an ellipsoid of rotation such that in any position of the at least one optical unit the optical axis is always orthogonal to a tangent of the partially transparent cap passing through a point in which the optical axis cuts the partially transparent cap.

5. The action camera of claim 4, wherein said coupler has a pair of pins joined to said mobile support element and to holes formed on a wall that defines the recessed housing.

6. The action camera of claim 4, wherein the recessed housing has a dovetail configuration and is bordered by a bottom wall and two longitudinal sidewalls inclined by an acute angle with respect to the bottom wall.

7. The action camera of claim 4, wherein said connector is disposed on said cover and on said base support, said connector comprising:
 a hole;
 a pin inserted into the hole; and
 a locking element that locks the connector.

8. The action camera of claim 7, wherein said pin protrudes from the mobile support element in order to be engaged into the hole obtained on the base disk of said cover, the hole of the base disk of the cover having a shank having a threaded hole that coincides with a center of the base disk of said cover, the pin of said mobile support element being internally empty and having a through hole, the locking element comprising a screw that is inserted into the hole of the pin of the mobile support element and screwed into the threaded hole of the shank disposed in the hole of the base disk of said cover.

9. The action camera of claim 1, further comprising:
 an anti-rotation element cooperative with said cover and said base support so as to prevent a free rotation of said cover with respect to said base support.

10. The action camera of claim 9, wherein said anti-rotation element is disposed on said cover and on said base support and comprises at least one hole and at least one button that is engaged in the hole.

11. The action camera of claim 10, wherein the button is joined with said base support and the hole formed on the cover.

12. The action camera of claim 1, further comprising:
 a plurality of modules stacked between said base support and the base disk of said cover, each module of said plurality of modules comprising one or more electronic devices.

13. The action camera of claim 12, wherein each module of said plurality of modules comprises:
 an upper disk-shaped projection protruding in an upper position from the module;
 a lower disk-shaped housing formed in a lower surface of the module;
 an upper electrical contact disposed in the upper disk-shaped projection; and
 a lower electrical contact disposed in the lower disk-shaped projection.

* * * * *